(12) United States Patent
Golan et al.

(10) Patent No.: US 9,076,132 B2
(45) Date of Patent: Jul. 7, 2015

(54) SYSTEM AND METHOD OF ADDRESSING EMAIL AND ELECTRONIC COMMUNICATION FRAUD

(75) Inventors: Lior Golan, Tel Aviv (IL); Nira Rivner, Ramat Gan (IL); Michal Tsur, Baltimore, MD (US); Amir Orad, Shoham (IL); Naftali Bennett, New York, NY (US)

(73) Assignee: EMC Corporation, Hopkinton, MA (US)

( * ) Notice: Subject to any disclaimer, the term of this patent is extended or adjusted under 35 U.S.C. 154(b) by 2356 days.

(21) Appl. No.: 10/578,591

(22) PCT Filed: Nov. 8, 2004

(86) PCT No.: PCT/US2004/036993
§ 371 (c)(1),
(2), (4) Date: Jul. 9, 2007

(87) PCT Pub. No.: WO2005/048522
PCT Pub. Date: May 26, 2005

(65) Prior Publication Data
US 2008/0052359 A1 Feb. 28, 2008

Related U.S. Application Data

(60) Provisional application No. 60/517,868, filed on Nov. 7, 2003.

(51) Int. Cl.
G06F 15/16 (2006.01)
G06Q 10/10 (2012.01)
H04L 29/06 (2006.01)

(52) U.S. Cl.
CPC .......... *G06Q 10/107* (2013.01); *H04L 63/1491* (2013.01); *H04L 63/1483* (2013.01)

(58) Field of Classification Search
USPC .......................................... 709/206
See application file for complete search history.

(56) References Cited

U.S. PATENT DOCUMENTS

| 6,330,672 | B1* | 12/2001 | Shur .............................. 713/176 |
| 2003/0131260 | A1 | 7/2003 | Hanson et al. |
| 2003/0225841 | A1 | 12/2003 | Song et al. |
| 2004/0148506 | A1 | 7/2004 | Prince |
| 2005/0257261 | A1* | 11/2005 | Shraim et al. .................... 726/22 |
| 2006/0053490 | A1* | 3/2006 | Herz et al. ....................... 726/23 |

OTHER PUBLICATIONS http://web.archive.org/web/20021011034338/www.sweetchilicauce.com/ntakes/KKI.html.*
http://www.419eater.com/index.php.*
http://en.wikipedia.org/wiki/Scam_baiting.*
Spitzner, "Honeytokens: The Other Honeypot," Jul. 21, 2003.*
International Search Report for PCT/US04/36993 mailed Feb. 14, 2005.

(Continued)

*Primary Examiner* — Andrew Georgandellis
(74) *Attorney, Agent, or Firm* — BainwoodHuang

(57) ABSTRACT

A system and method may respond to a fraudulent attack, such as a Phishing attack. The system and method may send a number of responses to party committing fraud, the responses designed to mimic the responses to a Phishing attack. The responses may include codes or marked information designed to entrap or detect the party committing fraud.

32 Claims, 2 Drawing Sheets

(56) References Cited

OTHER PUBLICATIONS

Cheswick B., "An Evening with Berferd in which a Cracker is Lured, Endured, and Studied", Proceedings of the Winter Usenix Conference, Jan. 20, 1992, pp. 163-173.
Spitzner L., "Honeytekans: The Other Honeypot", Internet (Online), Jul. 21, 2003, XP002437720 Retrieved From the Internet: URL:http://web.archive.org/web/20030811090852/http://www.securityfocus.com/infocus/1713.
Chunming Rong et al., "Honeypots in Blackhat Mode and Its Implications", Parallel and Distributed Computing, Applications and Technologies, 2003, Proceedings of the Fourth International Conference on Aug. 27-29, 2003, Piscataway, NJ, USA, IEEE, Aug. 27, 2003, pp. 185-188.
Supplementary European Search Report for EP Application No. EP 04 80 0816 dated Jun. 27, 2007.

* cited by examiner

SYSTEM AND METHOD OF ADDRESSING EMAIL AND ELECTRONIC COMMUNICATION FRAUD

CROSS-REFERENCE TO RELATED APPLICATIONS

This application is a National Phase Application of PCT International Application No. PCT/US2004/036993, International Filing Date Nov. 8, 2004, claiming priority of U.S. Provisional Patent Application, 60/517,868, filed Nov. 7, 2003.

FIELD OF THE INVENTION

The present invention relates to email fraud detection and prevention, more specifically to interfering with and/or tracking certain fraudulent attacks; furthermore, the present invention relates to testing data gathering systems.

BACKGROUND OF THE INVENTION

The rapid increase in the number of users of electronic mail and the low cost of distributing electronic messages via the Internet and other electronic communications networks has made marketing and communications with existing customers via e-mail an attractive advertising medium. Consequently, in addition to communications that are warranted by consumers, e-mail is now frequently used as the medium for unsolicited communication and marketing broadcasts of messages to e-mail addresses, commonly known as "Spam". "Phishing", which may include e-mail identity fraud and brand impersonation are the newest forms of harmful Spam attacks that threaten the integrity of companies doing business online. Fraudulent Phishing email messages may be considered to be, for example, messages that appear to be sent from a legitimate company's website or domain address, but in fact are not. In reality, spammers or other parties are hijacking the company's brand to attract the attention of customers, often to gain personal information.

Lately, financial institutions as well as other companies that have a trusted relationship with their customers have been attacked by Phishing. For the sake of example, and without limiting the generality of the phenomena, if a bank is attacked by Phishing, individuals may receive an e-mail which is allegedly sent by the bank, and are persuaded into supplying private or valuable identifying personal data online under several pretences—for example, without limitation,—so that the bank can register them to a new service, or to protect against unauthorized charges.

The damage to the bank, or any other company whose identity if faked is significant. Phishing can injure valuable corporate brand equity, ruin customer trust, increase operational costs through growing customer complaints, and present additional risks and problems. The bank or other attached company may has to publish a general warning to its customers, and sometimes even cancel or block people's accounts.

Phishing may involve, but is not limited to, for example: (1) The originators of "Phishing" e-mails attempt to make the e-mail distributed seem to be coming from a legitimate source. In order to achieve that goal, the Phishing e-mail may be disguised as a legitimate e-mail, and includes elements and characteristics of a legitimate organization, such as (without limitation) logo, domain names, brands and colors; (2) In order for the Phishing to be advantageous for its originators, the originators of "Phishing" need to somehow divert information that the trusting consumers submit in response to the seemingly legitimate e-mail. Such information might be diverted via for example a link to a separate web-page that requires the individual to input valuable private information, or via telephone, if the e-mail directs the recipient to call a certain telephone number (following which the recipients valuable information might be collected over the phone). Such illegitimate links or contact telephone numbers may be referred to as "illegitimate contact pointers".

The implications of the above characteristics of Phishing are that any Phishing e-mails typically include a mixture of both legitimate and illegitimate contact pointers (such as links to other web pages or telephone numbers). Legitimate contact pointers would point to web pages or telephone numbers that belong to legitimate e-mail senders. Illegitimate contact pointers would point to web pages or telephone numbers that belong to the parties committing fraud.

SUMMARY OF THE INVENTION

In one embodiment, a system and method may respond to a fraudulent attack, such as a Phishing attack. The system and method may send a number of responses to party committing fraud, the responses designed to mimic the responses to a Phishing attack. The responses may include codes or marked information designed to entrap or detect the party committing fraud.

Embodiments of the present invention relate to a method and system for reducing negative consequences associated with the submitting of valuable and confidential information by individuals to fraudulent impostors, as well as for increasing the likelihood that fraudulent impostors be captured.

Embodiments of the current invention include a system and method for minimizing the impact of Phishing scams as well as facilitating the detection of the originators of the attack.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
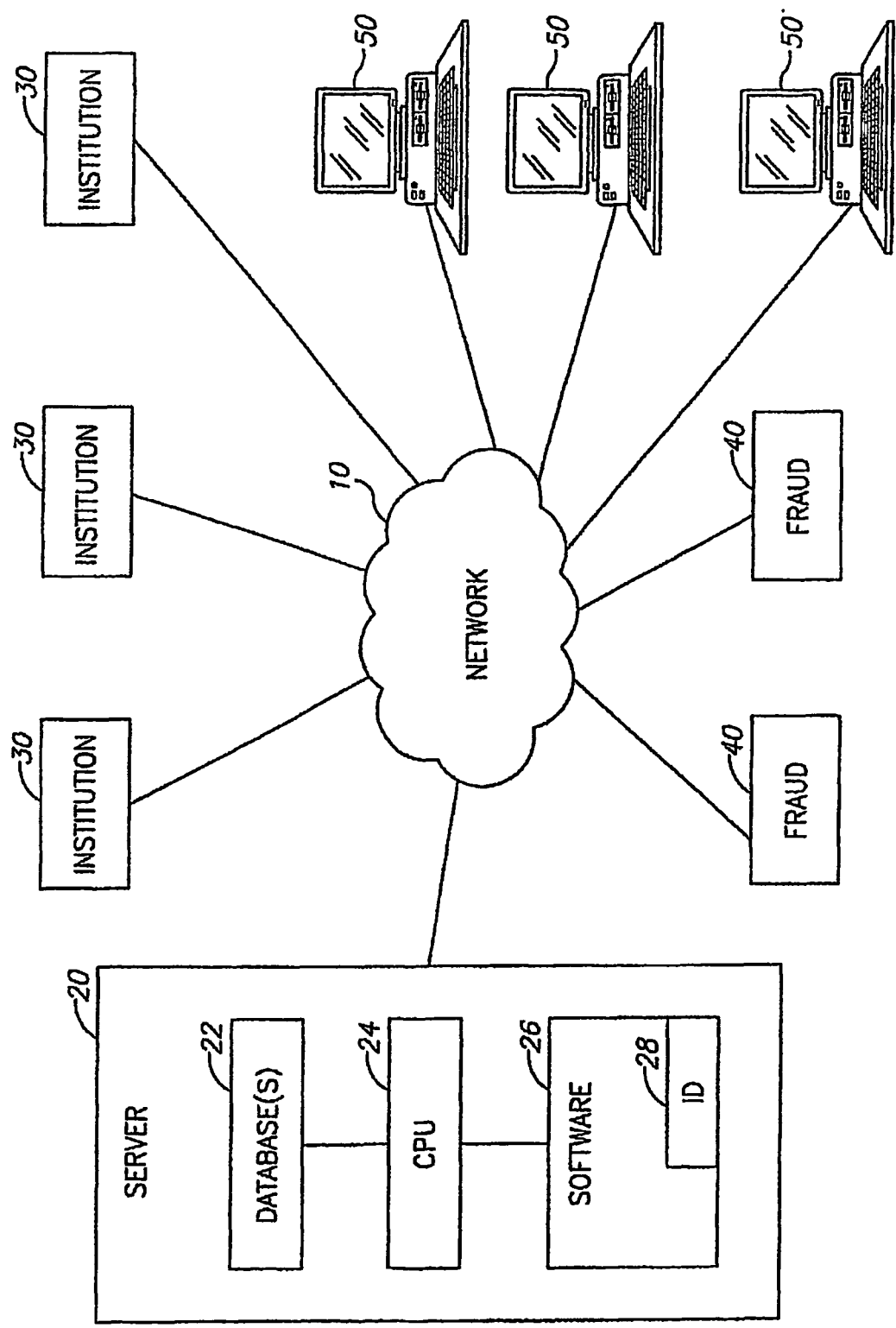
FIG. 1 depicts a system according to one embodiment of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention. Various examples are given throughout this description. These are merely descriptions of specific embodiments of the invention, but the scope of the invention is not limited to the examples given.

The goal of a useful anti-Phishing and/or anti-fraud service may include, for example, any or all of the following:

1. Detection of potential Phishing scams;
2. Configuration options to allow the definition of Phishing detection parameters;
3. Alerting against a detected scam;
4. Option for the targeted institution (e.g., bank, financial institution, etc.) to request:
   a. Blocking of the Phishing e-mail before it reaches the recipients' mailboxes;
   b. Alert to consumers' (e.g., accountholders, cardholders) e-mails;
   c. Approval of the mail as an official e-mail by the institution (non-Phishing);
5. Tools for minimizing the impact of the Phishing scam, as well as tools that facilitate detecting the Phishing originators.

According to one embodiment of the present invention, the detection of Phishing scams can be done using existing anti e-mail-spam methods which can issue alerts whenever they detect an e-mail, which contains at least X (e.g., a suitable number, where one may be a suitable number) legitimate contact pointers such as domains, trademarks, service names, phone numbers, etc., by a centralized service, such as a "Service Provider," along with illegitimate pointers.

One such anti e-mail-spam method is called "honey pots" or "decoys". An anti e-mail-spam company that works with this method may set up numerous e-mail accounts that do not belong to real people or entities, and lists them in public e-mail guides. If an e-mail gets to these addresses it can be either the result of a spam or an honest mistake. If the e-mail reaches several addresses the chances of an honest mistake are slim. Other methods may include for example content filtering or sniffing.

Once a potential Phishing scam or other unwanted data communication is identified some pre-processing may be performed to make sure it is indeed a suspicious e-mail or communication.

Various devices and architectures, and sets of devices may form a system according to various embodiments of the present invention, and my effect a method according to embodiments of the present invention. Methods according to various embodiments of the present invention may, for example, be executed by one or more processors or computing system, (including, for example, memories, processors, software, databases, etc.), which, for example, may be distributed across various sites or computing platforms; alternatively some methods according to embodiments may be executed by single processors or computing systems. The following illustration outlines a solution architecture according to one embodiment of the present invention; other suitable architectures are possible in accordance with other embodiments of the invention.

FIG. 1 depicts a system according to one embodiment of the invention. A network 10 such as the Internet, the Internet in combination with other networks, or some other network combination of networks connects a set of entities. A central server 20 may provide services such as monitoring Phishing or other e-mail oriented fraud, and may try to counteract, interfere with, or track such fraud, or attempt to track down the identity of the perpetrators. A set (where set can include one element) of institutions 30, such as banks, financial institutions, or other institutions, which may be targets of Phishing or other fraud, may request services from the central server 20. One or more parties committing fraud (which may be known as for example "fraudsters") 40 may attempt to commit fraud via email, for example via "Phishing", by sending fraudulent emails to a set of users 50, for example requesting the users to contact an institution 30 using a contact point or address (e.g., an email address, an Internet address, etc.) or phone number that is actually directed to the party 40 or an associate. The contact point or address may be made to appear as it if belongs to a legitimate institution 30. The central server 20 may attempt to send fake or other information to the contact point or other address to interfere with or stop fraudulent activities. In one embodiment server 20 monitors for Phishing attacks; in other embodiments other entities such as institutions may inform server 20 regarding Phishing attacks.

The contact point may be an e-mail address. Thus the data in a response may be sent to the party committing fraud via email, possibly directly (e.g. by the party requesting the details to be sent via the "Reply To" email option, or by a JavaScript client side code that does so automatically, etc.) or indirectly to the party (e.g., the party may implement a web-to-mail interface, wherein the user data is eventually sent to an email address from where it is later collected by the party).

Central server 20 may include one or more database(s) 22, a controller or processor 24, and software 26, which may include for example, an identity generator 28, or other suitable modules. Controller or processor 24 may execute instructions in software 26 to perform various functions such as those described herein. The functionality of central server 20 may be implemented in other manners, such as being distributed among other sites, being included in one or more institutions, etc. For example, in one embodiment a bank may include the fraud blocking or tracking capabilities as described herein. The central server 20 may have as customers institutions 30 that wish to stop and/or entrap fraud committing parties, but such a customer-client relationship is not needed; for example central server 20 may be a government or non-profit entity, part of a consortium of interested parties, or part of an institution 30.

The central server 20 may detect fraudulent activity (e.g., Phishing); alternatively the central server 20 may act after being requested by an other party which has detected fraudulent activity. The central server 20 may for example, provide multiple responses to a contact point created by a party 40. The central server may respond multiple times to mimic a group of users responding to the fraud (each response may include different data), and the responses may be timed, paced, and/or numbered to mimic the natural response of a large group of people. For example, responses may start with a flurry and then gradually slow down, and each response may be sent at a somewhat random time within an overall desired pattern. The total number of responses may be in proportion to a size of the attack in response to which the responses are sent. For example, the number of responses can be X % (e.g., 0.1%, 1%, 5%, 10%, etc.) of the number of emails or other communications that constituted the Phishing or other attack, possibly based on known response rates. Each response may be for example the central server filling in or sending details to a web site or web form, possibly at the contact point. Furthermore, within each response, data may be entered at a speed an pace to mimic a human entering information using a keyboard and pointing device (e.g., mouse). A response may include a set of details such as a set of false personal information. Multiple sets of false personal information can be created and for example stored in a database 22.

According to one embodiment of the current invention the central server may perform tasks such as, for example: Dilution: For example, a Phishing website (e.g., at a contact point defined by a party 40) maintained by a party 40 which tries to collect data from the central server (or "Service Provider") customers (e.g., institutions 30) is filled with fake records of people, thus diluting the quality of data that the parties committing fraud obtain; (2) Mark & Block: For example, using responses with marked data, the Phishing website which tries to collect data from institution 30 is filled with fake records of people. When the central server 20 detects that those "fake people" attempt to access the central server 20 real website/ Service or an institution 30 website, it may be possible to identify the source of that attempt (using the phony records) and to block any further attempts from that same source (e.g. IP, location etc), this way, when the party committing fraud (e.g., "fraudster") attempts to access central server 20 or institution 30 service using real valuable stolen data (and not the fake one sent to it) such usage will be blocked, including good details; (3) Mark and Capture: For example, the Phishing website which tries to collect data from the Service provider's customers, is filled with fake records of people via responses with marked data. When the Service Provider detects that these "fake people" attempt to enter the Service provider's real website, the Service Provider can attempt to locate the party committing fraud. A central server 20 or institution 30 can monitor, for example, an institution or central server website, for the use of marked data in an attempted transaction. Other actions may be taken.

According to one embodiment of the current invention dummy responses may be sent to the fraudulent site (e.g., maintained by a party 40) by, for example, the central server 20 as if the responses were coming from real users who were defrauded by the scam. The fraudulent site is fed with useless records, and hence the quality of data that is obtained is diluted. According to one embodiment the amount of responses can be configurable so that it would be consistent with the estimated attack size (importantly the estimated number of users who may actually give away their personal information, which can be determined by using statistical assessment).

According to one embodiment, in order to avoid suspicion on behalf of the party committing fraud 40, the central server 20 may simulate a real human user feeding data at an appropriately slow, human typing pace, seemingly from multiple IP addresses with intervals between data string to the other.

Data in a response may include or be marked with for example data or codes identifiable to a central server 20 or institution 30, so that for example its use can be tracked. Furthermore, data may be marked with cryptographically encoded portions. Details may be marked in a manner making it (for example by using a cryptographically strong algorithms) infeasible to spot or detect, except for those who have a cryptographic key with which the marking can be deciphered and/or extracted from the data.

An embodiment of the system and method may be designed to reduce the quality of the data obtained by the party committing fraud during a Phishing attack, and thus mitigate the attack's negative consequences. By diluting the data obtained by the party committing fraud, the stolen data obtained by the "fraudster" becomes less valuable, hence reducing the incentive to attack service providers who utilize the proposed system and method.

According to one embodiment a limited amount of dummy responses are submitted to the fraudulent site where the responses are marked, such that the responses can be tracked at a later stage. This may be done in combination with sending un-marked responses. This way the use of the credentials provided as part of these responses can be monitored. Whenever the system identifies an attempt to use such "marked credentials" it is possible according to one embodiment to block the access to the service from such location (typically an IP address where "bait information" was attempted to be used from), and therefore prevent attempts to use real credentials from such location. According to a different embodiment of the current invention parties committing fraud might be located based on the marked responses. In many cases these "fraudsters" obtain information during a Phishing attack, but do not attempt to use the data for several months. Marking the dummy credentials submitted to the fraudster according to the above embodiment may allow a server or other party to follow the credentials for a long period of time. In addition, in other embodiments having other uses, dummy, randomized or manufactured responses, with randomized or fake data, may be submitted to other sites or contact points, such as systems being tested or debugged, or for the purpose of training.

According to one embodiment of the current invention, a multiple-access-point computer network may be used to simulate responses from various points of presence via different network connections, such as for example Internet connections. Parties committing fraud therefore are not able ti simply "ignore" all information coming from a single point of presence, and cannot detect that in fact fake credentials are fed.

Following a Phishing attack, according to one embodiment of the current invention the system may in responding and sending false data use a multiple-access-point computer network which uses several levels of design, which helps to ensure that dummy responses are undetectable. Responding may be conducted using multiple Internet access points, multiple intermediate networks, and/or multiple intermediate Internet service providers. Internet accounts used to generate the dummy responses may use dynamic network IP addresses, or use proxy servers and imitate behavior or users that pass via proxy when relevant using both dialup and broadband connection in order to further disguise the counter-measure. The dialup connections may alternate between different telephone exchanges in order to prevent sophisticated parties committing fraud from tracking the physical location of the source IP addresses.

Figure 2:
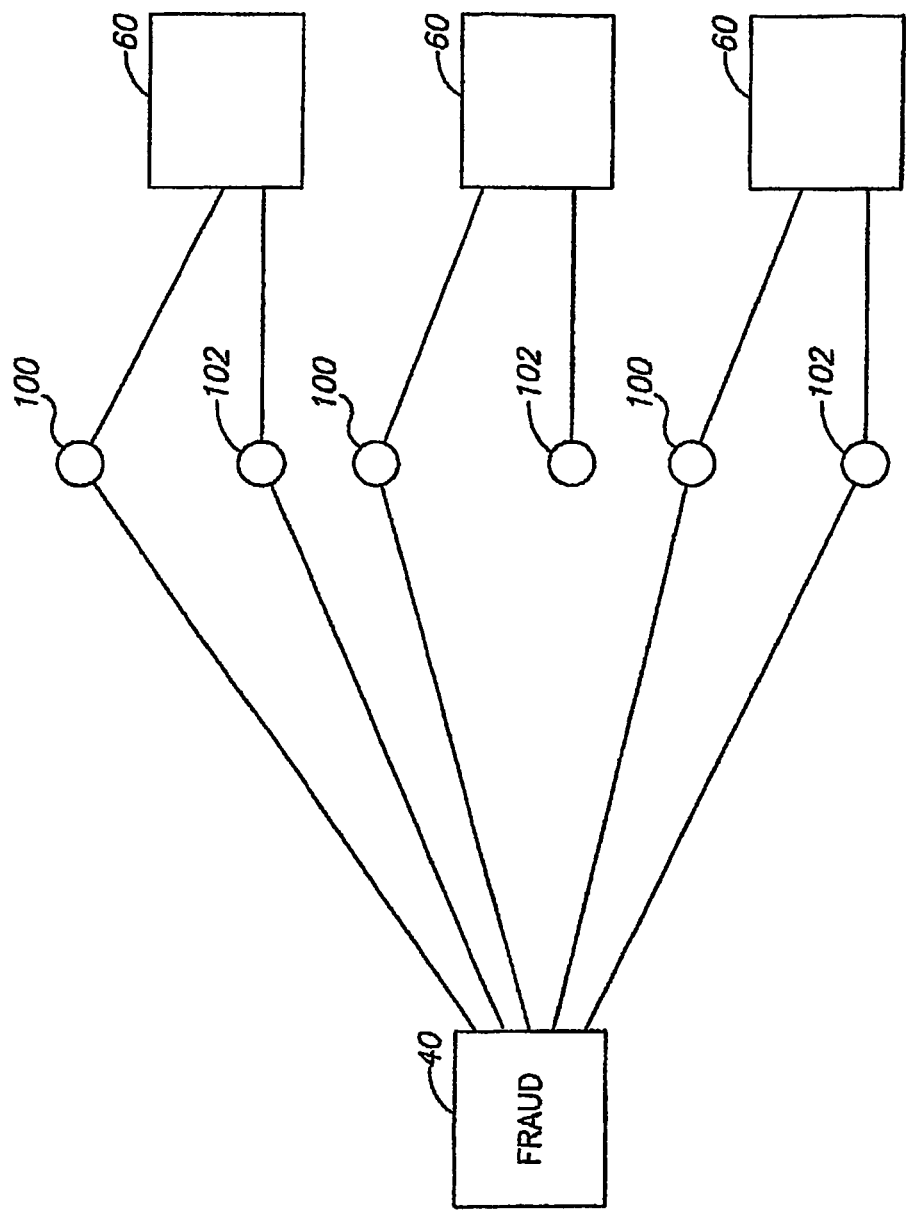
FIG. 2 illustrates a multiple-access-point computer network which may be used with an embodiment of the present invention.

FIG. 2 illustrates a multiple-access-point computer network which may be used with an embodiment of the present invention. Users, computers, or other access points 60 may contact a party 40 which intends to commit fraud via multiple ISPs or other service providers 100 and 102, possibly being geographically distributed, possibly via network 10 (FIG. 1). Alternately, central server 20 may contact party 40 via multiple ISPs or other service providers 100 and 102.

According to one embodiment of the invention the central server 20 may use a scheduler or other system which may regulate the "response sending rate" in order to ensure that the dummy responses are monitored, and may thus simulate real responses. The scheduler may be important where large amounts of dummy responses are fed to the spoofed site in order to de-value the obtained information. As with other modules, the scheduler can be implemented in the software 26.

According to another embodiment of the invention responses may be designed to resemble human behavior and appear to be sent from actual recipients of the fraudulent e-mail. This can be done for example without limitation by using Robot-like software, possibly implemented in the software 22.

Each response may include details which are internally consistent within the response. For example, according to one embodiment of the invention the system and method includes an "identity generator", which produces phony details that appear to be legitimate (e.g., adhering to the rules of different data elements, such as user names and passwords, online banking credentials, credit card details, checks etc.). The identity generator may be configured to match each specific company's details and rules.

The identity generator may create dummy or fake identities using a large database (e.g., part of database 22) of names, local addresses, e-mail domains, and more. Such fake identities may be part of database 22. The dummy identity may e coherent or consistent, meaning different pieces of information do not contradict each other, and also may match the external conditions (such as for example Internet connection). Thus in one embodiment, the details within a response includes a set of details consistent with an Internet service provider to be used for the response. A phone number that may be part of the details may match the address as well as the telephone exchange used for a dial-up connection used to transmit the response. In addition the e-mail address may match the ISP used and so on. Other sets of details may be used. In the case of online credential fraud, the central server 20 may randomly generate usernames and passwords that match the company's rules as well as an e-mail address which appears to match the username etc.

According to one embodiment of the invention a system that responds to Phishing attacks by generating random credentials and feeding them into we-forms, could serve additional purposes such as testing services, debugging services as well as for the sake of demonstrating various scenarios. In such an embodiment, a website or other contact point to be demonstrated, tested, etc. can be contacted multiple times to, for example, enter data, fill in a web-form, etc. with a set of data. Each set of data can include, for example, a set of details, the set of details including a set of false personal information. The contacts or filling of data on for example the web-form can include transmitting information at a speed designed to mimic a human entering data. The timing of the contacting can be set to resemble that of a set of unrelated users. Each contact or response may include a set of details that are internally consistent.

For such a method, or any of the methods described herein, a database may be created, including a set of false or manufactured data which may be for example organized into identities, each false identity including a set of data which is consistent within the set. For example such a database may be stored in database(s) 22.

Credentials generated and used as part of the service may be created using a cryptographic key, such that the marking of the credentials could not be detected without the key. Real data may be used, so that the party committing fraud will actually perform true transactions, and could more easily be tracked.

In other embodiments, a system and method that creates and/or transmits manufactured data, as described herein, may have other uses, for example, training, testing, developing, demonstrating, etc. For example, responses or other sets of manufactured or fake personal data may be sent to one or more contact points, wherein, the data is used to train people, such as customer support representatives, sales representatives, etc., interacting with the system. Bothe the system or server generating the data and the system receiving the data may be within the same organization or the same system. An automated or semi-automated system for dealing with large numbers of people can be designed, demonstrated, or tested using such a system and method. Responses or sets of false or manufactured data may be sent to demonstrate, debug, test or develop a system which may deal with sensitive personal information, so that real data is not revealed to the viewers.

A system and method that creates and/or transmits fake or manufactured data, as described herein, may for example be used against software such as "Trojan horses", or other software, where, for instance, malicious software installs itself on a user's system (e.g., a workstation, a personal computer, etc.) in stealth mode. The piece of software may listen to incoming and outgoing communications of the client's system via for example the Internet, and may monitor browser events and user inputs (e.g. keyboard logging). When such a piece of software intercepts a login activity in which the user logs in to a designated web site or system (or to any site), the login credentials may be collected through the keyboard logging facility and covertly transmitted to a site in control of the party committing fraud. Such transmission can occur over a multiplicity of protocols, such as e-mail (e.g., SMTP), the Internet (e.g., HTTP/HTTPS), FTP, and others. In one embodiment of the invention a system and method may generate and/or transmit, for example in a set of responses or transmissions including fake data, mimicking the behavior of "Trojan horses", or other malicious software that may be designed to be installed on a user's systems. As described herein, such responses may be sent at a pace that mimics a set of responses from a set of geographically dispersed users using different computer and communications systems and may include fake data as described herein. In such embodiment, the dilution or responses may work directly against the party's contact point, using the protocol chosen by the party, and imitating the behavior the software would assume.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

The invention claimed is:

1. A method performed by a server processor comprising:
responding, by the server processor, to a contact point created by a party, the response including a set of details, the set of details including a set of false personal information, said false personal information including information associated with a false account;
monitoring said false account for attempted access; and
based on an attempt to access said false account, determining that said party is attempting to commit fraud,
wherein responding to the contact point includes sending a number of responses, each response including a different set of details, each set of details including a respective set of false account information,
wherein each set of details is consistent with a respective Internet service provider used to respond, and
wherein the number of responses sent by the server processor is in proportion to a size of an attack in response to which the responses are sent.

2. The method of claim 1, wherein the contact point is an Internet address referring to a web site.

3. The method of claim 1, wherein the contact point is an e-mail address.

4. The method of claim 1, wherein responding comprises transmitting information at a speed designed to mimic a human entering data.

5. The method of claim 1, comprising setting the timing of the responses to resemble that of a set of users responding to a Phishing attack.

6. The method of claim 1, wherein each of said plurality of responses includes a set of details that is internally consistent.

7. The method of claim 1, comprising creating a database including a plurality of false identities, each false identity including an internally consistent set of data.

8. The method of claim 1, wherein the responding is in response to an email Phishing attack, wherein the contact point is transmitted by email.

9. The method of claim 1, wherein the responding is conducted for the plurality of responses using a respective plurality of Internet access points.

10. The method of claim 1, wherein the responding is conducted for the plurality of responses using a respective plurality of intermediate networks.

11. The method of claim 1, wherein the responding is conducted for the plurality of responses using a respective plurality of intermediate Internet service providers.

12. The method of claim 1, wherein the data in a response is marked, the method comprising monitoring an institution for the use of marked data in an attempted transaction.

13. The method of claim 1, wherein responding comprises entering data into a web-form.

14. The method of claim 1, comprising marking a response using a cryptographic algorithm, such that the marking is detectable only with a suitable cryptographic key.

15. The method of claim 1, wherein the details and the timing of the sending of the data mimic the behavior of automated client software.

16. A server comprising:
a server processor;
a memory storing instructions, which when executed by the server processor, cause the server processor to:
respond to a contact point created by a party, the response including a set of details, the set of details including a set of false personal information, said false personal information including information associated with a false account;
monitor said false account for attempted access; and
based on an attempt to access said false account, determine that said party is attempting to commit fraud,
wherein responding to the contact point includes sending a number of responses, each response including a different set of details, each set of details including a respective set of false account information,
wherein each set of details is consistent with a respective Internet service provider used to respond, and
wherein the number of responses sent by the server processor is in proportion to a size of an attack in response to which the responses are sent.

17. The system of claim 16, wherein the contact point is an Internet address referring to a web site.

18. The system of claim 16, wherein the contact point is an e-mail address.

19. The system of claim 16, wherein responding comprises transmitting information at a speed designed to mimic a human entering data.

20. The system of claim 16, wherein the timing of the responses is to resemble that of a set of users responding to a Phishing attack.

21. The system of claim 16, wherein said server processor is to respond to said contact point a plurality of times, using a plurality of respective sets of internally consistent details, each set of details including a respective set of false personal information, including information associated with a respective false account, wherein said server processor is to monitor said plurality of false accounts for attempted access.

22. The system of claim 21, comprising a database including a set of false identities, each false identity including a set of data which is consistent within the set of data, wherein said server processor is to respond to the contact point using said sets of false identities.

23. The system of claim 21, wherein the responding is conducted using a plurality of intermediate networks for the plurality of responses respectively.

24. The method of claim 1, wherein:
the monitoring of said false account further includes identifying a source of an attempt to access said false account; and
responding to an identified source of the attempt to access said false account by alerting an authorized authority of the identified source.

25. The method of claim 24, wherein alerting the authorized authority includes alerting at least one of law enforcement authorities, a client and a service provider hosting the identified source.

26. A computer program product having a non-transitory computer readable medium which stores a instructions, which when executed in a server processor, cause the server processor to perform a method comprising:
responding, by the server processor, to a contact point created by a party, the response including a set of details, the set of details including a set of false personal information, said false personal information including information associated with a false account;
monitoring said false account for attempted access; and
based on an attempt to access said false account, determining that said party is attempting to commit fraud,
wherein responding to the contact point includes sending a number of responses, each response including a different set of details, each set of details including a respective set of false account information,
wherein each set of details is consistent with a respective Internet service provider used to respond, and
wherein the number of responses sent by the server processor is in proportion to a size of an attack in response to which the responses are sent.

27. The computer program product of claim 26, wherein the contact point is an Internet address referring to a web site.

28. The computer program product of claim 26, wherein the contact point is an e-mail address.

29. The computer program product of claim 26, wherein responding comprises transmitting information at a speed designed to mimic a human entering data.

30. The computer program product of claim 26, comprising setting the timing of the responses to resemble that of a set of users responding to a Phishing attack.

31. The computer program product of claim 26, wherein each of said plurality of responses includes a set of details that is internally consistent.

32. The computer program product of claim 26, comprising creating a database including a plurality of false identities, each false identity including an internally consistent set of data.

* * * * *